Aug. 29, 1933.  C. A. M. MASSINO  1,925,053
IMPLEMENT HANDLE
Filed Sept. 1, 1931
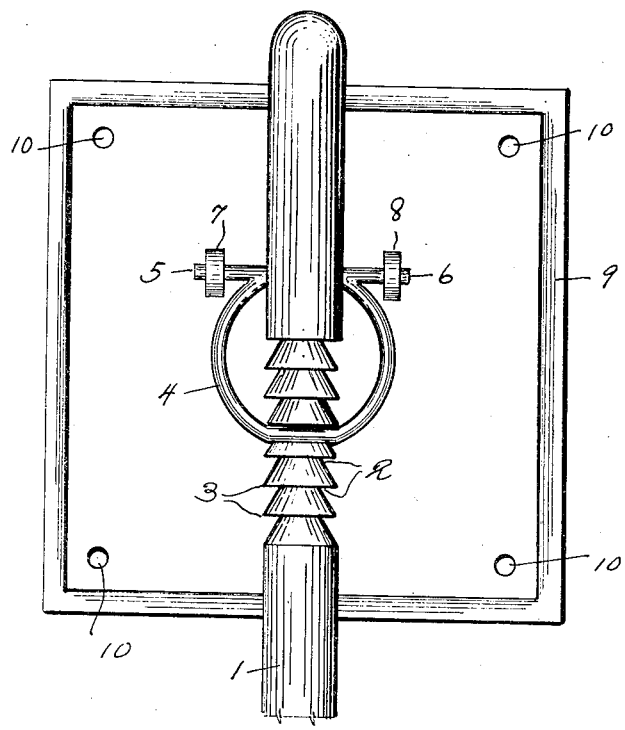
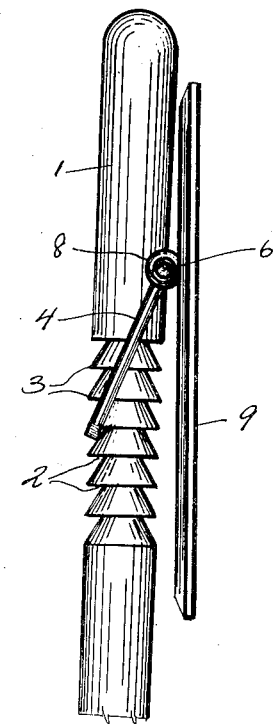
Inventor
Cesar A. Marquez Massino
By Watson E. Coleman
Attorney Patented Aug. 29, 1933

1,925,053

UNITED STATES PATENT OFFICE 1,925,053

IMPLEMENT HANDLE

Cesar A. Marquez Massino, Habana, Cuba, assignor of fifty per cent to Antonio M. Acosta and Tomas J. Acosta, both of Habana, Cuba Application September 1, 1931, Serial No. 560,606, and in Cuba September 5, 1930

1 Claim. (Cl. 15—143)

This invention relates to improvements in brooms or like implements and particularly to improved means whereby the implement may be suspended when out of use.

The general object of the invention is to provide a very simple and easily operable device for suspending a broom or other implement so that the bristles or fibres of the broom will not rest upon the floor and be thereby bent and deteriorate.

A further object is to provide the handle of the implement with means for suspending it which shall act as a characteristic mark or indication of a permanent nature and readily observable even at a distance which is thus useful both for the manufacturer and the user since it serves to identify the object and to distinguish it from other similar objects on the market.

My invention is illustrated in the accompanying drawing, wherein:—

Figure 1 shows a front view of a grasping or holding mechanism, with a section of stem or handle of an implement, a broom, for example, inserted in and held by said mechanism.

Figure 2 is a side elevation of the structure shown in Figure 1.

Referring now to the drawing, in which like numbers indicate like parts in all views, No. 1 represents a stem or handle, preferably cylindrical and usually of wood, such, for example, as that of a broom, a street sweeper's brush, a feather duster, etc., the periphery of which, at any part thereof but preferably at a point adjacent to its upper end, has a number of circular grooves or indentations, 2, thus forming on said handle a series of ridges or projecting portions of circular form, 3. This handle coacts with the supporting loop 4, of greater diameter than that of the handle 1, in order that the latter may easily pass through it, which loop 4 has at its back or rear part lateral trunnions 5 and 6 and serve with the bearings 7 and 8 to pivotally support the holding loop on the back plate 9. Holes 10 in the back 9 permit the plate 9 to be permanently fastened to a wall behind a door or in any other suitable place. It will be seen from Figures 1 and 2 that the circular grooves or indentions 2 define a series of upwardly tapering frustrated conical portions on the handle constituting in effect ratchet teeth permitting the handle to be inserted upward through the loop 4 but upon a downward movement of the handle the ring 4 will automatically engage with the handle and support it. These upwardly and inwardly inclined grooves 2 need not be so closely arranged as is shown on the drawing but may be spaced further apart and preferably these grooves are disposed to leave a space at the upper end of the handle by which the implement may be grasped.

It is to be noted that the loop 4 has a straight portion at the free end of the loop which coacts with the under faces of the upwardly tapering frustrated conical portions on the handle of the broom and that this straight portion has a length approximately equal to the diameter of the broom or greater than the smallest diameter of the broom handle, thus securing a full contact between the under face of each frustrated conical portion and this flattened portion of the loop 4.

By the application of the invention in the manner explained and illustrated, the straws, bristles, etc., of the implement so hung and suspended are prevented from bending and losing their straightness, which is so necessary for their efficient service or operation, and there will be no bending of the said straws, which is the case with brooms at present in use and which do not have the present invention, when stood on the floor, as heretofore explained. By means of this invention the soiling of the wall, which usually occurs when the handle 1 is stood against the wall, is prevented.

It is obvious that the present invention is not solely limited to use with brooms, as while one of its objects is to provide the protecting and identifying means which it furnishes, to that class of implements, it may be employed or utilized with ony other class of implements or tools which are provided with handles or stems, such as feather dusters, mops, hoes, shovels, hammers, brushes, and in general any object the handle or stem whereof permits the incorporation of the invention and which it is desired to keep hung on a wall or similar place away from contact with the floor or ground when not in immediate use.

In like manner a number of fastening loops 4 may be placed in a group on a single back of suitable capacity, said backs being located in shops or work places of carpenters or other workmen, in order that they may keep their tools or implements properly hung, the stem or handle of the latter being grooved or indented in accordance with this invention.

Furthermore, the back 9 also serves the purpose—which is another of the objects of this invention—of providing a suitable surface for containing marks, lettering and drawings, in relief, printed, lithographed, etc., which can be used by the factory or manufacturer so desiring, as an advertising means, this new system of advertising being in consequence another of the various objects of the invention, since a system is thereby provided which is economical, not only because of its low cost, but also because it possesses the great advantage of being permanent, of long duration, and so located under the eye of the observer that it forms for the latter a constant reminder of the object thus advertised, and in this manner tends to a possible future purchase of such article.

I claim:

An implement handle having a plurality of successive circumferentially extending indentations, the face of each indentation extending inward and toward the end of the handle remote from the implement and then extending outward in a plane at right angles to the longitudinal axis of the handle as and for the purpose stated.

CESAR A. MARQUEZ MASSINO.